US011559167B2

(12) United States Patent
Bruin-Slot et al.

(10) Patent No.: US 11,559,167 B2
(45) Date of Patent: *Jan. 24, 2023

(54) MODULAR ROTISSERIE ACCESSORY FOR USE IN OVEN CAVITY

(71) Applicant: WHIRLPOOL CORPORATION, Benton Harbor, MI (US)

(72) Inventors: Zachary J. Bruin-Slot, Baroda, MI (US); Janglih John Lin, Normal, IL (US)

(73) Assignee: Whirlpool Corporation, Benton Harbor, MI (US)

(*) Notice: Subject to any disclaimer, the term of this patent is extended or adjusted under 35 U.S.C. 154(b) by 349 days.

This patent is subject to a terminal disclaimer.

(21) Appl. No.: 16/880,236

(22) Filed: May 21, 2020

(65) Prior Publication Data

US 2020/0275800 A1 Sep. 3, 2020

Related U.S. Application Data

(62) Division of application No. 15/395,480, filed on Dec. 30, 2016, now Pat. No. 10,660,468.

(51) Int. Cl.
A47J 37/04 (2006.01)
(52) U.S. Cl.
CPC .................... A47J 37/043 (2013.01)
(58) Field of Classification Search
CPC .... A47J 37/043; A47J 27/002; A47J 37/1295; A47J 43/18; A47J 36/22; A47J 36/32; A47J 37/0611; A47J 37/0623; A47J 37/0629; A47J 37/0664

USPC .......... 99/332, 339, 348, 416, 418; 219/218, 219/388, 389
See application file for complete search history.

(56) References Cited

U.S. PATENT DOCUMENTS

| | | |
|---|---|---|
| 1,111,835 A | 7/1838 | Pierce |
| 1,762,035 A | 6/1930 | Soylian |
| 1,790,488 A | 1/1931 | Saunders et al. |
| 1,871,654 A | 8/1932 | Blier |
| 2,012,702 A | 8/1935 | Zolotas |
| 2,179,646 A | 11/1939 | Spartalis |
| 2,205,914 A | 6/1940 | Stafford |
| 2,517,360 A | 4/1946 | Singer |
| 2,482,601 A | 9/1949 | Spartalis |
| 2,565,786 A | 8/1951 | Spartalis |
| 3,503,323 A | 3/1970 | Swetlitz |
| 3,583,307 A | 6/1971 | Lee, Sr. |
| 3,744,403 A | 7/1973 | Castronuovo |
| 3,817,164 A | 6/1974 | Hintze |

(Continued)

FOREIGN PATENT DOCUMENTS

| | | |
|---|---|---|
| EP | 2092864 A2 | 8/2009 |
| EP | 2343484 A2 | 7/2011 |

*Primary Examiner* — Phuong T Nguyen
(74) *Attorney, Agent, or Firm* — Price Heneveld LLP

(57) ABSTRACT

An accessory for an oven includes a support base and a heating element hingedly coupled to the support base. The heating element is movable between a generally horizontal position and a generally vertical position. A motor is positioned in the support base. A drive assembly is positioned in the support base and operably coupled to the motor. A rotary pan is operably coupled to the drive assembly and positioned on a top side of the support base. A food holder assembly can be operably coupled to the rotary pan.

20 Claims, 14 Drawing Sheets

(56) References Cited

U.S. PATENT DOCUMENTS

| | | | |
|---|---|---|---|
| 3,956,979 | A | 5/1976 | Coroneos |
| 4,092,512 | A | 5/1978 | Suzuki et al. |
| 5,106,642 | A | 4/1992 | Ciofalo |
| 5,442,999 | A | 8/1995 | Meister |
| 5,539,184 | A * | 7/1996 | Su ................ A47J 37/0664 99/421 V |
| 5,575,196 | A | 11/1996 | Masel et al. |
| 5,586,490 | A | 12/1996 | Saman |
| 5,665,258 | A | 9/1997 | Hsu |
| 5,814,795 | A | 9/1998 | Kim et al. |
| 6,104,017 | A | 8/2000 | Kim et al. |
| 6,180,923 | B1 | 1/2001 | Yang |
| 6,279,465 | B1 | 8/2001 | English |
| 6,330,851 | B1 | 12/2001 | Riesselmann |
| 6,363,836 | B1 * | 4/2002 | Usherovich ........... A47J 37/043 99/421 V |
| 6,425,319 | B1 | 7/2002 | Wu |
| 6,742,446 | B2 | 6/2004 | McLemore et al. |
| 6,933,484 | B2 | 8/2005 | Lindley et al. |
| 8,621,988 | B1 | 1/2014 | O'Dea |
| 8,948,579 | B2 | 2/2015 | Lee |
| 2011/0240005 | A1 | 10/2011 | Warner |
| 2012/0305549 | A1 | 12/2012 | Wylie |
| 2016/0081509 | A1 * | 3/2016 | Delrue .................. A47J 27/004 99/348 |

* cited by examiner

MODULAR ROTISSERIE ACCESSORY FOR USE IN OVEN CAVITY

CROSS-REFERENCE TO RELATED APPLICATION

The present application is a divisional of U.S. patent application Ser. No. 15/395,480 filed Dec. 30, 2016 entitled MODULAR ROTISSERIE ACCESSORY FOR USE IN OVEN CAVITY, now U.S. Pat. No. 10,660,468, the entire disclosure of which is hereby incorporated herein by reference.

FIELD OF THE DISCLOSURE

The present disclosure generally relates to an accessory for use in an oven cavity. More specifically, the present disclosure relates to a modular rotisserie accessory for use in an oven cavity.

BACKGROUND

Rotisserie cooking in a cavity of an oven is typically performed with a horizontal rotisserie assembly. Horizontal rotisserie assemblies often require larger manufacturer tolerances between components to facilitate coupling between a spit rod and a drive hub. The larger manufacturer tolerances can lead to consumers having a very low perception of quality of the horizontal rotisserie assemblies due to rattling between components.

SUMMARY

According to one aspect of the present disclosure, an accessory for an oven includes a support base and a heating element hingedly coupled to the support base. The heating element is movable between a generally horizontal position and a generally vertical position. The accessory further includes a motor positioned in the support base. A drive assembly is positioned in the support base and operably coupled to the motor. A rotary pan is operably coupled to the drive assembly and positioned on a top side of the support base. A food holder assembly can be operably coupled to the rotary pan.

According to another aspect of the present disclosure, an accessory for an oven includes a support base and a heating element hingedly coupled to the support base. The heating element is movable between a first position and a second position. A motor is positioned in the support base. A drive assembly is positioned in the support base and operably coupled to the motor. A rotary pan is operably coupled to the drive assembly and positioned on a top side of the support base. A food holder assembly is operably coupled to the rotary pan. The food holder assembly can be a vertical rotisserie.

According to yet another aspect of the present disclosure, an accessory for an oven includes a support base and a heating element hingedly coupled to the support base. The heating element is movable between a first position and a second position. A motor is positioned in the support base. A drive assembly is positioned in the support base and operably coupled to the motor. A rotary pan is operably coupled to the drive assembly and positioned on a top side of the support base. A food holder assembly is operably coupled to the rotary pan. The food holder assembly can be an air cooker.

These and other aspects, objects, and features of the present disclosure will be understood and appreciated by those skilled in the art upon studying the following specification, claims, and appended drawings.

DETAILED DESCRIPTION

Figure 1:
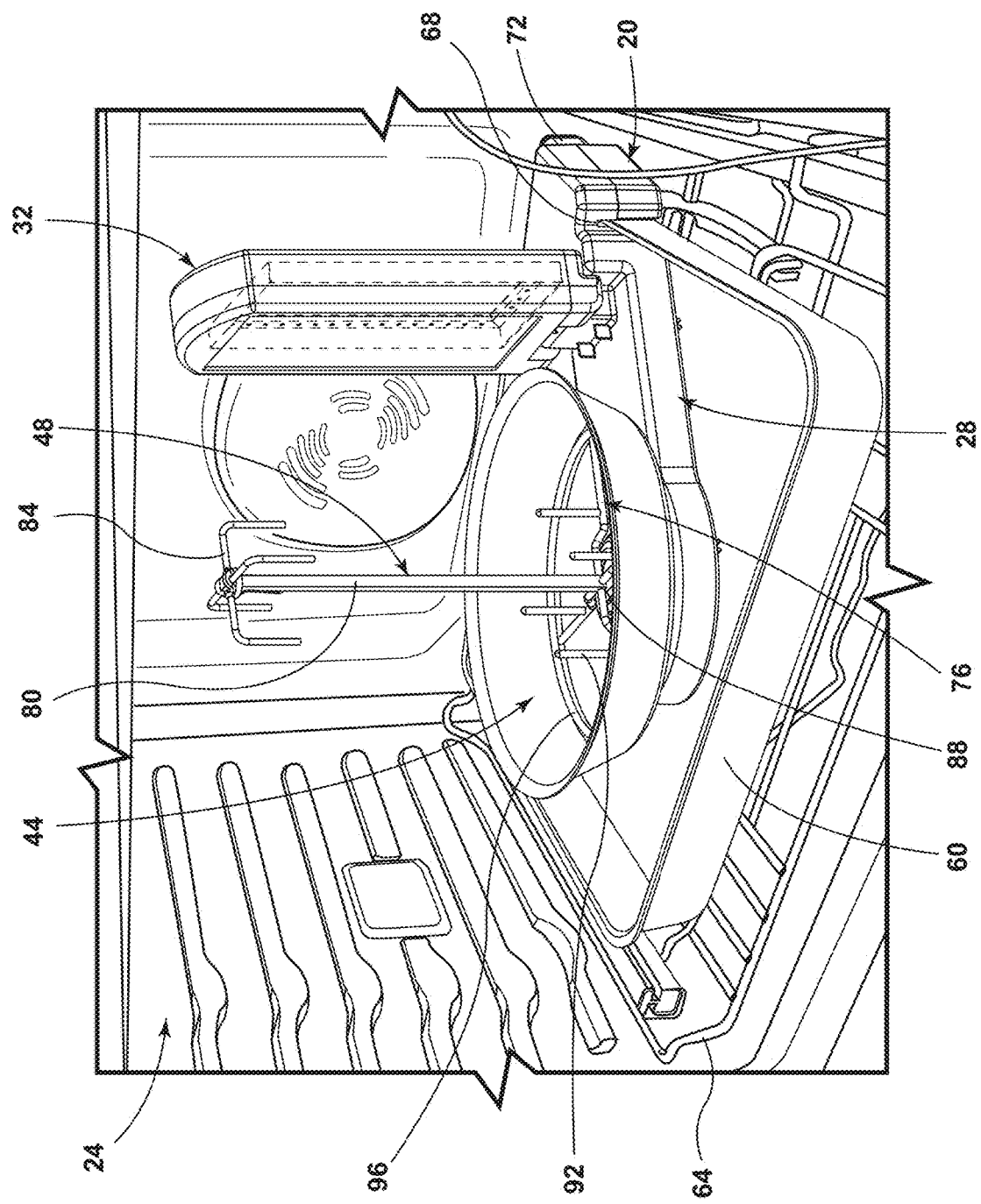
FIG. 1 is a side perspective view of one embodiment of an accessory for an oven with the accessory in an open position.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an accessory for use in an oven cavity. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-14, an accessory 20 for an oven 24 includes a support base 28 and a heating element 32 hingedly coupled to the support base 28. The heating element 32 is movable between a generally horizontal position (FIG. 2) and a generally vertical position (FIG. 1). A motor 36 is positioned in the support base 28. A drive assembly 40 is positioned in the support base 28 and operably coupled to the motor 36. A rotary pan 44 is operably coupled to the drive assembly 40 and positioned on a top side of the support base 28. A food holder assembly 48 is operably coupled to the rotary pan 44.

Referring again to FIG. 1, the accessory 20 for the oven 24 is operably coupled to a base pan 60 and is positioned within a cavity of the oven 24. The base pan 60 rests on a rack 64 of the oven 24. The base pan 60 is configured to catch drippings and/or debris from the accessory 20 during normal operation. The base pan 60 engages with the accessory 20 at a slot 68 in the support base 28. A rear portion of the support base 28 includes a plug 72 that engages with a power source within the cavity of the oven 24. The power source within the cavity of the oven 24 provides power to the accessory 20 such that rotary and heating functionalities of the accessory 20 can be utilized independent of the cooking functionalities of the oven 24. The base pan 60 can provide increased stability of the accessory 20 within the oven 24. The increased stability provided by the base pan 60 is the result of providing the support base 28 with a level and continuous surface to rest upon rather than a discontinuous surface provided by the structure of the rack 64. Typical racks 64 of ovens 24 resemble wire-like structures.

With reference again to FIG. 1, the heating element 32 is hingedly coupled to the support base 28 proximal the plug 72. The hinged coupling of the heating element 32 to the support base 28 permits pivotable movement of the heating element 32 relative to the support base 28. The heating element is movable between a first position and a second position. The first position of the heating element 32 can be, for example, a generally horizontal position while the second position of the heating element 32 can be, for example, a generally vertical position. The generally horizontal position of the heating element 32 can represent a closed position of the accessory 20. The generally vertical position of the heating element 32 can represent a use position of the accessory 20. Additionally, the heating element 32 can be pivoted about the hinged coupling to an obtuse angle relative to the support base 28 such that heat from the heating element 32 more directly or more indirectly contacts a foodstuff held by the food holder assembly 48.

Referring further to FIG. 1, the rotary pan 44 is positioned on the support base 28 at an end that is opposite the plug 72. The food holder assembly 48 is supported by and passively engages with the rotary pan 44. The food holder assembly 48 includes a holder base 76, a spit rod 80, and an upper stabilizer fork 84. The holder base 76 can be held in the rotary pan 44 by gravimetric forces on at least one of the food holder assembly 48 and a foodstuff coupled to the food holder assembly 48. The gravimetric engagement between the holder base 76 and the rotary pan 44 enables transmission of rotational motion imparted on the rotary pan 44 to the food holder assembly 48 via the holder base 76. Additionally, the passive engagement between the rotary pan 44 and the holder base 76 of the food holder assembly 48 can be beneficial in the event that a foodstuff attached to the food holder assembly 48 contacts the heating element 32 during rotation and interferes with the ability of the food holder assembly 48 to rotate. In such an event, the passive engagement between the rotary pan 44 and the holder base 76 of the food holder assembly 48 prevents binding, damage, or failure of the accessory 20. An event where the foodstuff may contact the heating element 32, for example, is when cooking an entire poultry, such as a chicken, that has not been trussed or bound. The wings of an untrussed or unbound chicken have a tendency to extend outward or flop open as the chicken cooks and contracts. The extension of the wings can cause the wings to contact the heating element 32 and prevent the food holder assembly 48 from rotating. If the food holder assembly 48 were positively and/or actively engaged by the drive assembly 40 or rotary pan 44, then when the wing contacted the heating element 32 a greater load would be experienced by the drive assembly 40 than was intended and can result in the failure or binding of the drive assembly 40 thereby damaging the accessory 20. Alternatively, the holder base 76 can actively and/or positively engage with a central portion of the rotary pan 44 such that rotational motion imparted on the rotary pan 44 is translated to the food holder assembly 48 via the holder base 76.

Referring still further to FIG. 1, the holder base 76 includes a spit-rod-receiving member 88, a lower stabilizer fork 92, and a stabilizing member 96. The spit-rod-receiving member 88 is centrally located in the holder base 76. The lower stabilizer fork 92 is positioned radially outward from the spit-rod-receiving member 88. The stabilizing member 96 is positioned radially outward from the lower stabilizer fork 92. The stabilizing member 96 can define an outer perimeter of the holder base 76. Additionally, the spit-rod-receiving member 88, the lower stabilizer fork 92, and the stabilizing member 96 can be integrally formed with the holder base 76. The spit rod 80 can be removably coupled to the holder base 76, for example, by the spit-rod-receiving member 88. Alternatively, the spit rod 80 can be fixedly coupled to the holder base 76, for example, by the spit-rod-receiving member 88.

Figure 2:
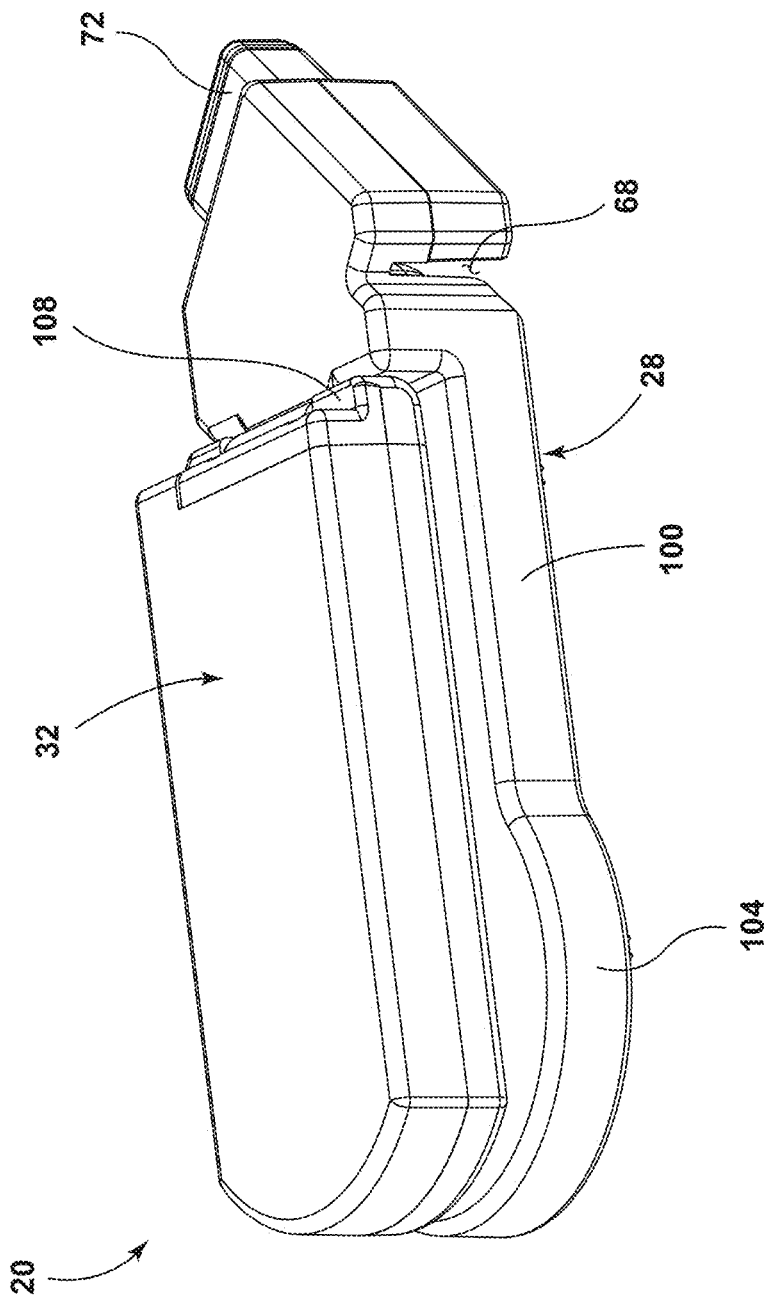
FIG. 2 is a side perspective view of an accessory for an oven with the accessory in a closed position.

Referring to FIG. 2, the accessory 20 can be placed in the closed position by removing the rotary pan 44 (FIG. 1) and the food holder assembly 48 (FIG. 1). Once the rotary pan 44 and the food holder assembly 48 are removed from the accessory 20, the heating element 32 can be pivoted to the generally horizontal position with respect to the support base 28. The compact nature of the closed position of the accessory 20 decreases the storage volume utilized to store the accessory 20 when not in use. The plug 72 protrudes backward from the support base 28 and is proximal the slot 68 in the support base 28. The portion of the support base 28 that is positioned directly below the heating element 32 while in the closed position can have a surface area that is greater than the surface area of the heating element 32. More specifically, the support base 28 can have a rectangular portion 100 and a circular portion 104. The circular portion 104 can be wider than the rectangular portion 100 such that a cross-sectional overlap between the support base 28 and the rotary pan 44 is increased and thereby results in greater stability of the rotary pan 44 while the accessory 20 is in use.

Referring again to FIG. 2, a perimeter of the heating element 32 can generally resemble a perimeter of the support base 28. More specifically, the sides of the heating element 32 can be generally straight or rectangular and a top of the heating element 32 can be arcuate or semi-circular to generally correspond with a perimeter of the circular portion 104. A bottom surface of the heating element 32 proximal the hinged coupling with the support base 28 can include a recessed portion 108 that allows pivoting of the heating element 32 with respect to the support base 28 through an angle of at least 90 degrees.

Figure 3:
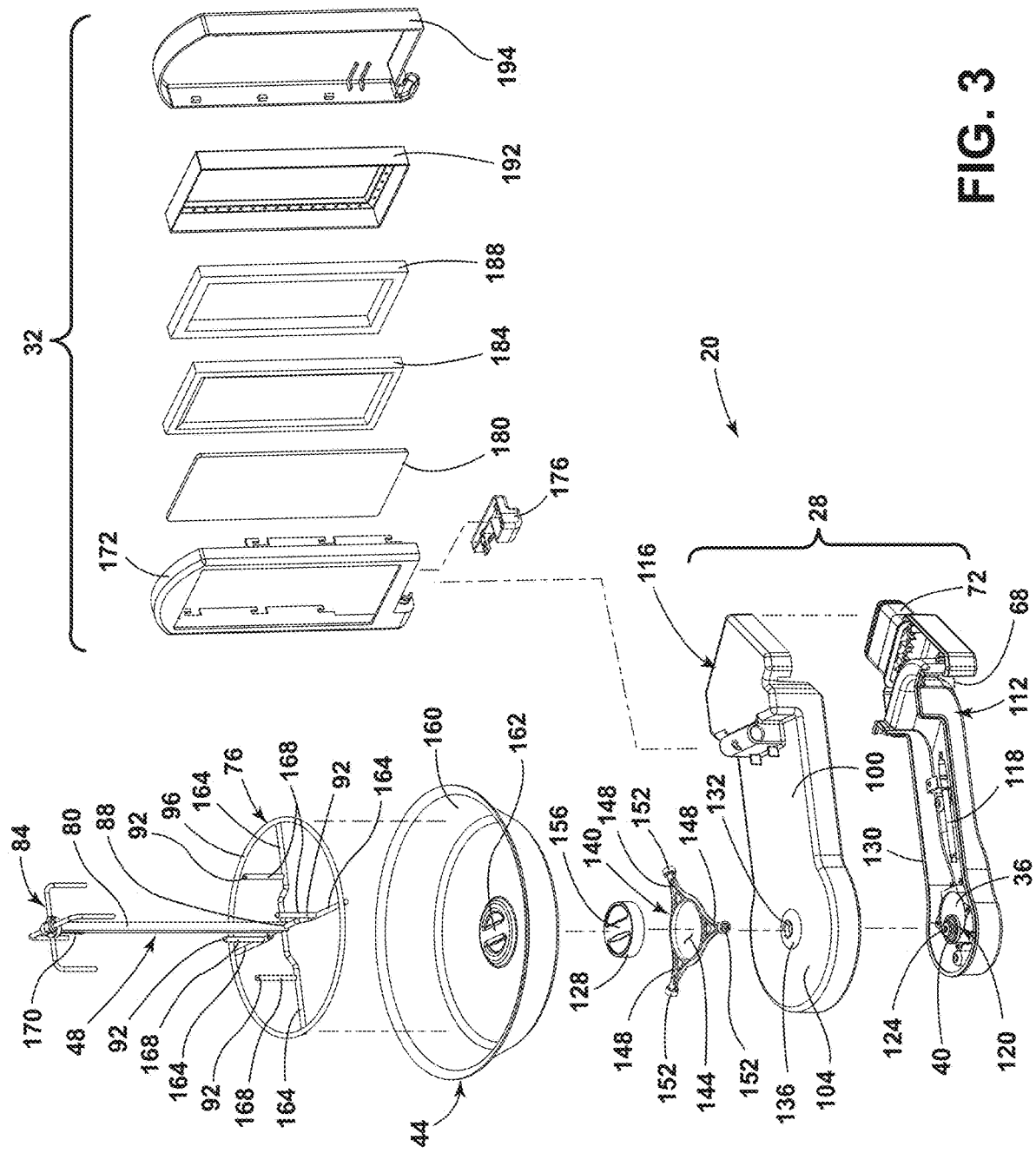
FIG. 3 is an exploded side perspective view of another accessory for an oven.

Referring now to FIG. 3, the support base 28 can include a lower housing 112 and an upper housing 116. The lower housing 112 includes the plug 72, the slot 68, the motor 36, the drive assembly 40, and a temperature sensor 118. The temperature sensor 118 can be a resistive thermal device (RTD), thermal couple, or the like. The drive assembly 40 further includes a drive hub 120 that further includes a motor flange 124 and a cap 128. The slot 68 can be generally arcuate in shape and span the width of the lower housing 112 such that the slot 68 can slidably engage with a corner of the base pan 60 (FIG. 1). The upper housing 116 is operably coupled to the lower housing 112. A seal 130 can be positioned at the junction between the upper housing 116 and the lower housing 112 to provide up to a water-tight closure that protects interior components of the support base 28.

Referring again to FIG. 3, the drive hub 120 can extend upwardly through a housing aperture 132 in the upper housing 116. The housing aperture 132 can be centrally located within the circular portion 104 of the support base 28. The housing aperture 132 can include a bezel 136 circumferentially about a perimeter of the housing aperture 132 that extends radially outward from the housing aperture 132. A roller assembly 140 can be positioned between the support base 28 and the rotary pan 44. The roller assembly 140 can include an opening 144 centrally located in the roller assembly 140 and a plurality of roller arms 148 that extend radially outward from the opening 144. Each of the roller arms 148 include a roller 152 rotatably coupled to an end of the associated roller arm 148. The cap 128 can fit within the opening 144 to engage with the motor flange 124. The cap 128 is depicted as a circular member with a protrusion 156 on an upper side thereof. The protrusion 156 can be utilized to transmit rotational motion from the cap 128 to the rotary pan 44. While the cap 128 depicted as a circular member, one of skill in the art will recognize that other shapes, sizes, and orientations are possible without departing from the concepts disclosed herein. The rotary pan 44 is positioned on the support base 28 with the roller assembly 140 positioned between the rotary pan 44 and the support base 28. The rotary pan 44 has a first diameter and a second diameter. The first diameter of the rotary pan 44 is positioned below the second diameter and the first diameter is smaller than the second diameter. The bottom of the rotary pan 44 terminates in the first diameter at a perimeter thereof. The first diameter and the second diameter are connected by sloping side walls 160. When assembled, the drive hub 120 extends through the housing aperture 132, into the opening 144 in the roller assembly 140 and further protrudes into a raised region 162 of the rotary pan 44 that corresponds in shape and dimensions with the cap 128. Additionally, when assembled the cap 128 engages with the drive hub 120.

Referring further to FIG. 3, the rotary pan 44 can be passively retained on the support base 28 with the weight of the rotary pan 44 helping to retain the rotary pan 44 on the support base 28. While the rotary pan 44 can be passively retained on the support base 28, the rotary pan 44 can actively engage with the cap 128 such that rotational motion of the cap 128 is transmitted to the rotary pan 44. The food holder assembly 48 is positioned within the rotary pan 44 and on top of the raised region 162. The diameter of the stabilizing member 96 corresponds with the first diameter of the rotary pan 44 such that the stabilizing member 96 fits within the first diameter of the rotary pan 44. The lower stabilizer fork 92 is positioned radially inward from the stabilizing member 96 and is operably coupled to the stabilizing member 96 by a plurality of stabilizer arms 164. The plurality of stabilizer arms 164 can include four stabilizer arms 164 that extend between the stabilizing member 96 and the spit-rod-receiving member 88. In the embodiment shown, the stabilizer arms 164 are spaced equidistant from each other and generally resemble a cross-like shape within the holder base 76. It is contemplated that greater or fewer stabilizer arms 164 can be utilized and the stabilizer arms 164 can be alternatively arranged without departing from the concepts disclosed herein. The lower stabilizer fork 92 includes an upward extending post 168 on each of the stabilizer arms 164. The spit rod 80 extends upwardly from the spit-rod-receiving member 88 and is operably coupled to the upper stabilizer fork 84. The upper stabilizer fork 84 slidably engages with the spit rod 80. The upper stabilizer fork 84 can include a resilient member 170 that actively engages the spit rod 80. Alternatively, a fastener can be provided on the upper stabilizer fork 84 that can be tightened or loosened to secure or adjust the upper stabilizer fork 84, respectively.

Referring again to FIG. 3, when the accessory 20 is plugged in, the accessory 20 can undergo one or more safety checks prior to providing power to the accessory 20. For example, in embodiments where the temperature sensor 118 is the resistive thermal device (RTD), the RTD can provide a first safety check in the form of a resistance signal that can be detected by a controller such that the controller recognizes that the accessory 20 has been installed. After the resistance signal is detected or sensed by the controller, a second safety check can be performed, such as a voltage signal detection. After the first safety check of the resistance signal and the second safety check of the voltage signal have been detected, the controller permits the application of the power voltage to the circuitry in the accessory 20. These safety checks are beneficial since the voltages being used by the accessory can be high voltages such as greater than 110 volts or greater than 220 volts. One of skill in the art will recognize that in place of the RTD, a fixed resistor can be used. However, by utilizing the RTD it is possible to monitor the temperature experienced by the motor 36 to ensure the motor 36 is not exposed to temperatures that exceed the rated operating temperatures of the motor 36.

Referring further to FIG. 3, the heating element 32 can include a front cover 172, a hinge-engagement portion 176, a ceramic glass layer 180, a first insulation portion 184, a second insulation portion 188, a metal housing 192, and a rear cover 194. The first insulation portion 184 and/or the second insulation portion 188 can further include heating members, such as wire heating members, that are operably coupled thereto and span the width and/or height of the associated insulation portion. The heating members can be wound, weaved, or generally resemble a grid pattern about the surface area of the central region of the first and/or second insulation portions 184, 188. The first insulation portion 184, the second insulation portion 188, the metal housing 192, and the heating members make up a heater subassembly within the heating element 32. The hinge-engagement portion 176 can be hollow such that a pass-through is provided for wiring that electrically connects the heating element 32 to the plug 72. While in use within the oven 24, the heating element 32 can be the sole source of heat. Alternatively, while in use within the oven 24, the heating and/or convection functionalities of the oven 24 can be utilized to expedite the cooking process, more evenly cook the foodstuff being prepared, maintain an even distribution of the heat within the oven 24, and/or better circulate the air within the oven 24.

Figure 4:
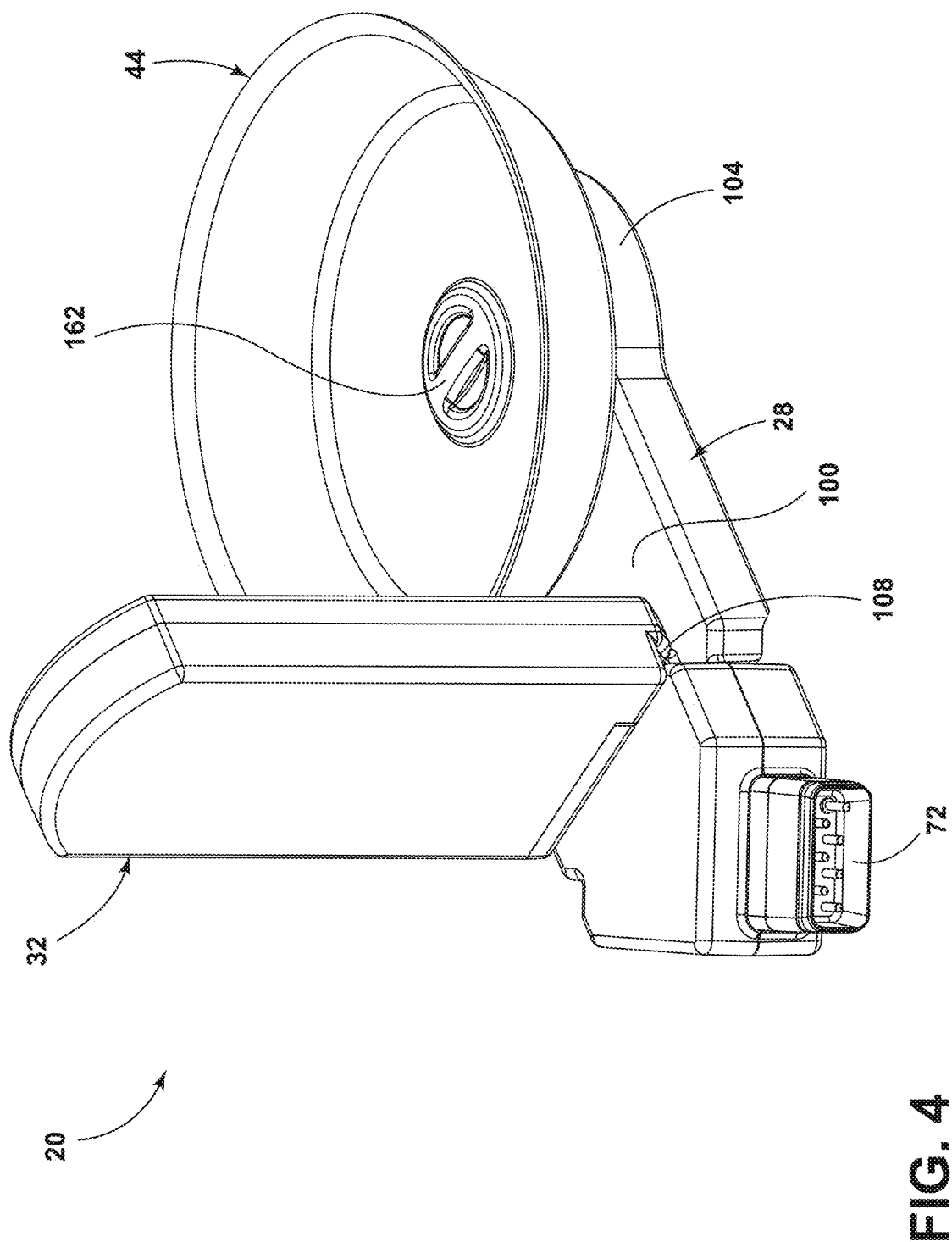
FIG. 4 is a rear perspective view of another accessory for an oven with the accessory in an open position.

Referring to FIG. 4, the accessory 20 is shown without the food holder assembly 48. The accessory 20, as shown, can be used as a building block to which various functionalities and/or attachments can be added. For example, the vertical rotisserie, an air fryer or cooker, a mixer assembly, etc can be added to the base building block embodiment shown. Similar to FIG. 1, the rotary pan 44 is supported on the support base 28 to a large extent by the circular portion 104 and to a lesser extent by the rectangular portion 100. The plug 72 is positioned in a rearward portion of the support base 28. The heating element 32 is hingedly coupled to the support base 28 and is equipped with the recessed portion 108 that permits pivoting of the heating element 32 to an obtuse angle with respect to the rectangular portion 100 of the support base 28. The obtuse angle of the heating element 32 relative to the rectangular portion 100 of the support base 28 can be, for example, greater than 90 degrees, greater than 95 degrees, greater than 100 degrees, greater than 105 degrees, greater than 110 degrees, greater than 115 degrees, greater than 120 degrees, greater than 125 degrees, greater than 130 degrees, or greater than 135 degrees. Alternatively, the obtuse angle of the heating element 32 relative to the rectangular portion 100 of the support base 28 can be, for example, in the range of 90 degrees to 135 degrees, in the range of 90 degrees to 130 degrees, in the range of 90 degrees to 125 degrees, in the range of 90 degrees to 120 degrees, in the range of 90 degrees to 115 degrees, in the range of 90 degrees to 110 degrees, in the range of 90 degrees to 105 degrees, in the range of 90 degrees to 100 degrees, or in the range of 90 degrees to 95 degrees.

Figure 5:
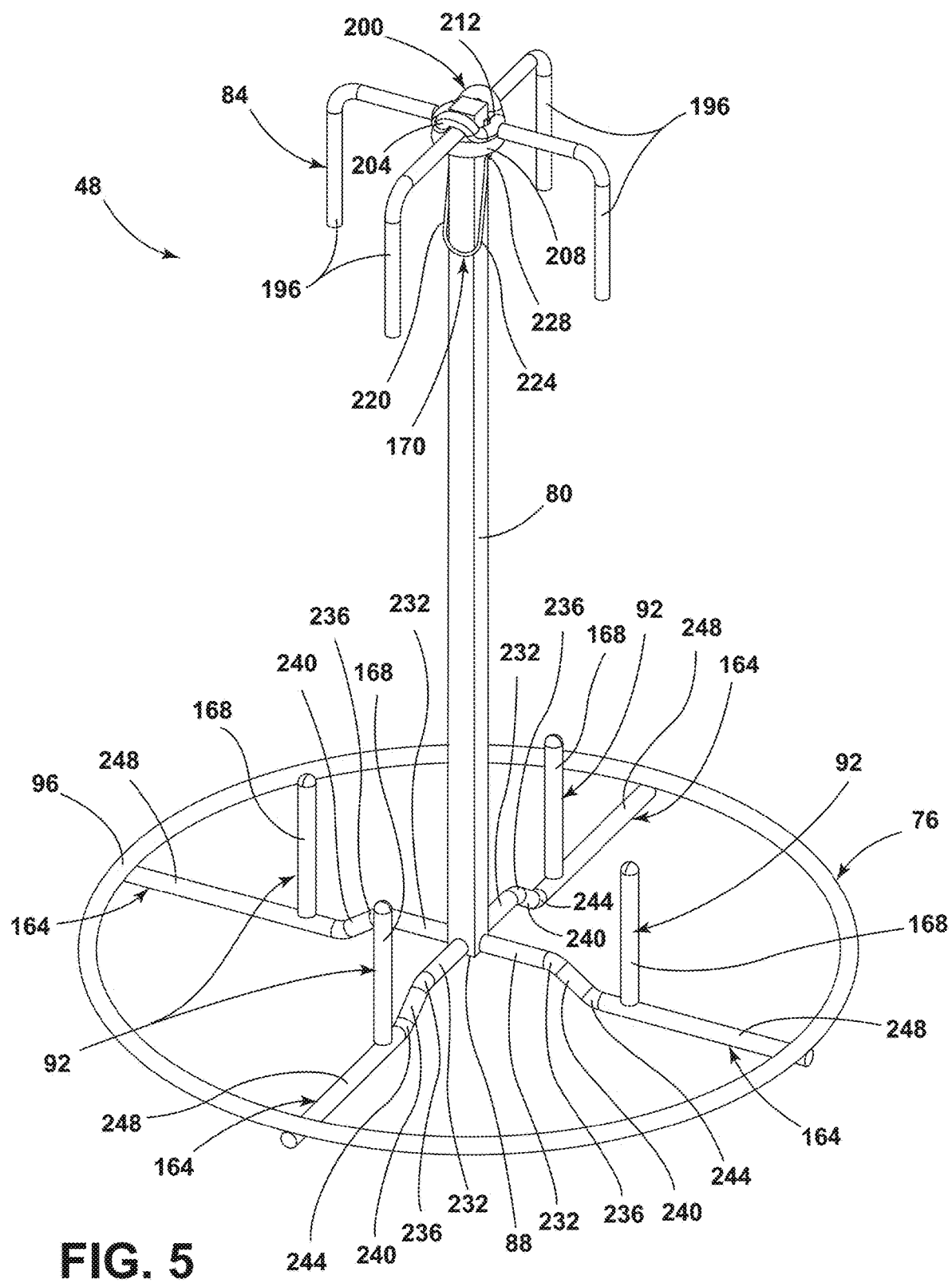
FIG. 5 is a top perspective view of a food holder assembly.

Referring to FIG. 5, the food holder assembly 48 is shown with the upper stabilizer fork 84, the spit rod 80, and the holder base 76. As described previously, the holder base 76 can further include the spit-rod-receiving member 88, the lower stabilizer fork 92, the stabilizing member 96, the stabilizer arms 164, and the upward extending posts 168. The upper stabilizer fork 84 can include one or more downward extending members 196 and a central portion 200. The one or more downward extending members 196 can be, for example, four downward extending members 196 that are approximately equidistant from one another and are operably coupled to the central portion 200 such that the downward extending members 196 resemble a cross-like structure. The central portion 200 can further include an upper support 204 and a lower support 208. The central portion 200, and by extension the upper and lower supports 204, 208, are equipped with a spit rod engaging aperture 212. The operable coupling of the downward extending members 196 with the central portion 200 does not interfere with the ability of the spit rod engaging aperture 212 to receive the spit rod 80. The central portion 200 can further include the resilient member 170 that is operably coupled to at least one of the upper support 204 and the lower support 208.

Referring again to FIG. 5, the resilient member 170 can be used to slidably engage the upper stabilizer fork 84 with the spit rod 80. Additionally, the resilient member 170 allows the upper stabilizer fork 84 to be adjusted vertically by the user to a vertical height on the spit rod 80 that best supports or retains a foodstuff attached to the spit rod 80. The resilient member 170 can be a generally U-shaped member having a first portion 220 and a second portion 224. The distance between inner walls of the first and second portions 220, 224 of the resilient member 170 can be dimensioned to generally correspond with a width or diameter of the spit rod 80. Additionally, at least one of the first and second portions 220, 224 can include a semi-circular region 228 positioned below the lower support 208 of the central portion 200. As the semi-circular region 228 approaches a lower surface of the lower support 208 the resilient member 170 then becomes straight once more to engage with inner surfaces of the spit rod engaging aperture 212 in the central portion 200. The semi-circular region 228 of the resilient member 170 can aid in maintaining contact between the resilient member 170 and the spit rod 80 when assembled. Additionally or alternatively, the semi-circular region 228 can provide a biasing force to the resilient member 170 such that the upper stabilizer fork 84 is securely held to the spit rod 80 when assembled.

Referring further to FIG. 5, the spit rod 80 can be directly coupled to the holder base 76 by the stabilizer arms 164. In the embodiment shown, the spit rod 80 is generally rectangular or square and each side of the spit rod 80 is directly coupled to one of the stabilizer arms 164. Moving radially outward from the spit rod 80, the stabilizer arms 164 each include an upper horizontal portion 232, a downward bend 236, a sloping portion 240, an upward bend 244, and a lower horizontal portion 248. The upper horizontal portion 232 is at a higher elevation above a support surface, such as the rotary pan 44, than the lower horizontal portion 248. By having the upper horizontal portion 232 at the higher elevation above the lower horizontal portion 248 the foodstuff that is attached to the spit rod 80 can be directly supported by the upper horizontal portion 232. Additionally, the raised nature of the upper horizontal portion 232 provides clearance over the raised region 162. The lower horizontal portion 248 is operably coupled to the stabilizing member 96. The operable coupling between the lower horizontal portion 248 and the stabilizing member 96 can be accomplished, for example, by coupling the lower horizontal portion 248 to a top surface of the stabilizing member 96, to an interior surface of the stabilizing member 96, or to an underside of the stabilizing member 96. The upward extending post 168 of the stabilizer arms 164 can be operably coupled to the lower horizontal portion 248. One of skill in the art will recognize that the upward extending post 168 can be otherwise arranged on the holder base 76 without departing from the concepts disclosed herein. For example, the upward extending post 168 can be positioned on the upper horizontal portion 232, on the sloping portion 240, or on the stabilizing member 96.

Figure 6:
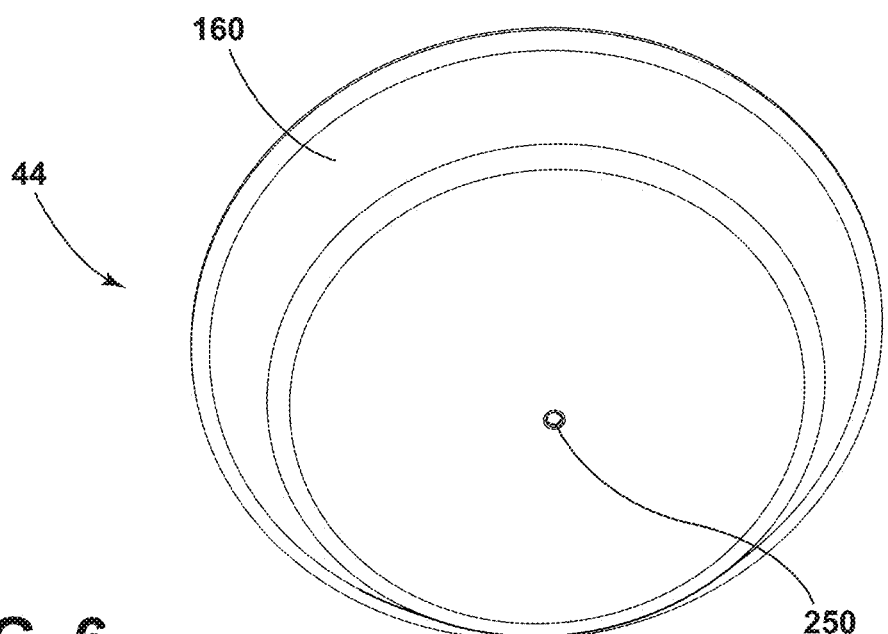
FIG. 6 is a bottom perspective view of a rotary pan.
Figure 7:
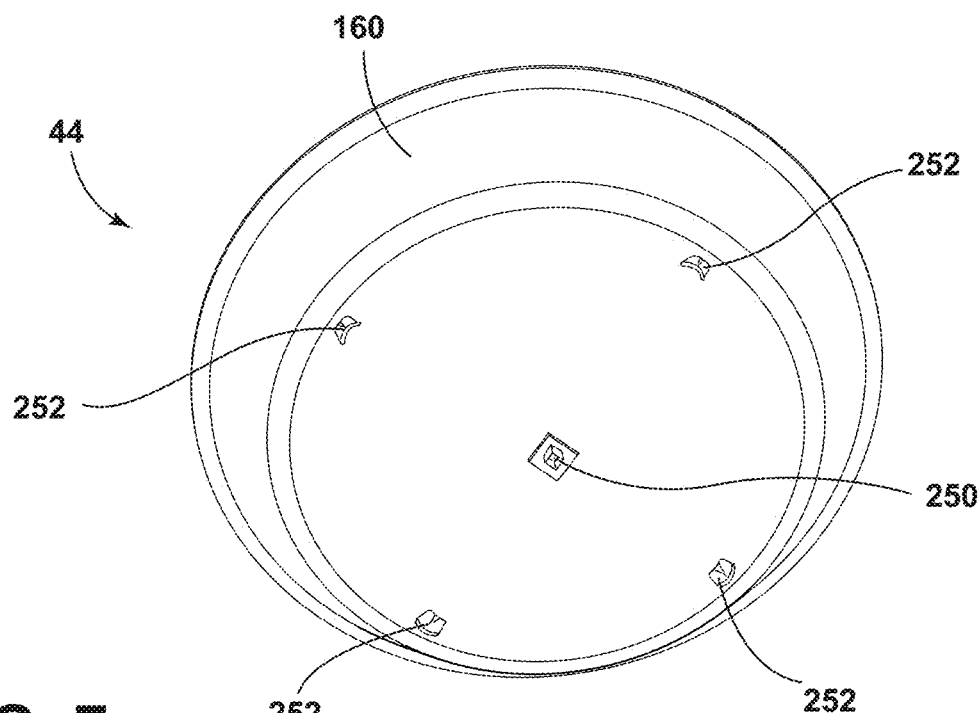
FIG. 7 is a bottom perspective view of another rotary pan of the present disclosure.

Referring now to FIGS. 6 and 7, an underside of the rotary pan 44 is shown according to various embodiments. The rotary pan 44 includes the side walls 160 that extend between the first diameter and the second diameter of the rotary pan 44. Additionally, the support surface of the rotary pan 44 can include a rotary pan aperture 250 that is centrally located in the bottom of the rotary pan 44. The structure of the rotary pan aperture 250 can take various forms without departing from the concepts disclosed herein. For example, the rotary pan aperture 250 can be generally circular, generally rectangular, or take the shape of any other polygon. However, it is beneficial if the rotary pan aperture 250 is dimensioned to engage with at least one of the spit rod 80, the drive hub 120, or the motor flange 124. Alternatively, the rotary pan aperture 250 can be dimensioned to permit at least one of the spit rod 80, the drive hub 120, or the motor flange 124 to pass through the rotary pan aperture 250 such that rotational motion of the drive hub 120 or the motor flange 124 can be translated directly to the spit rod 80 and/or the rotary pan 44. The underside of the rotary pan 44 can be further equipped with a plurality of feet 252. The feet 252 can be used to aid in stabilization of the rotary pan 44 while the rotary pan 44 has been separated from the support base 28. A user may remove the rotary pan 44 from the support base 28, for example, to prepare a foodstuff for cooking. When the rotary pan 44 is removed from the support base 28, the feet 252 can rest upon a preparation surface such as a countertop or a cutting board and provide increased stability of the rotary pan 44.

Figure 8:
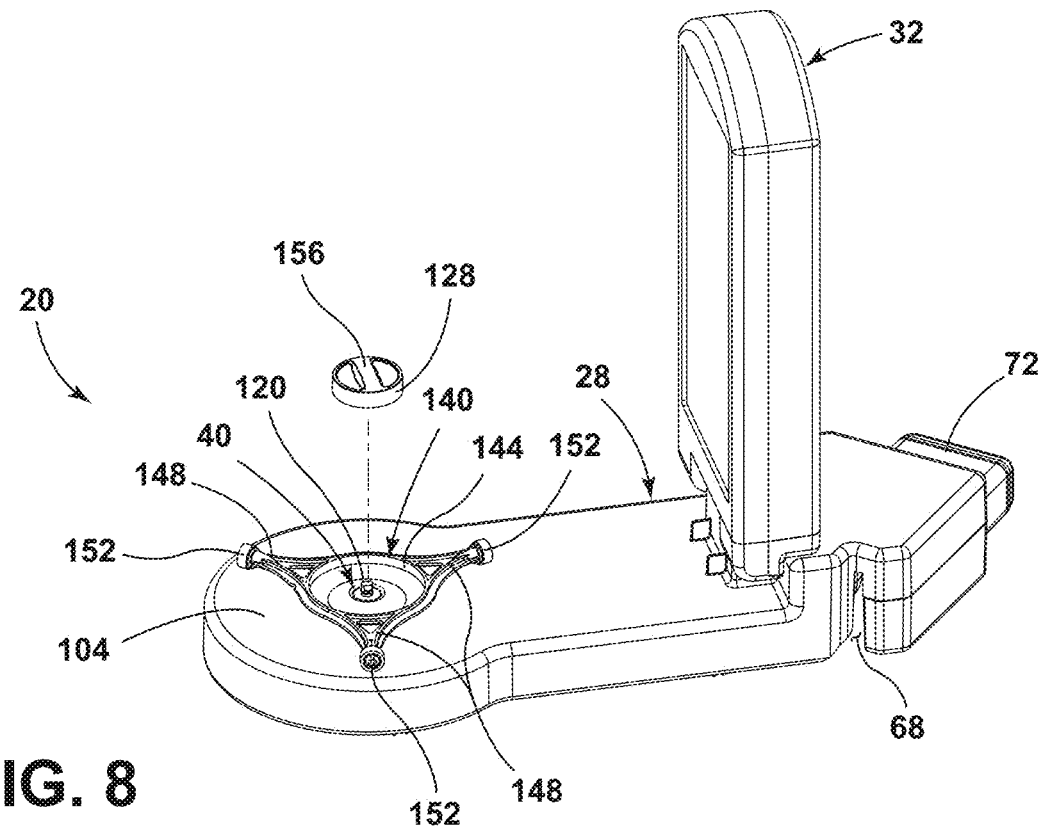
FIG. 8 is a partially exploded side perspective view of an accessory for an oven, according to one embodiment.
Figure 9:
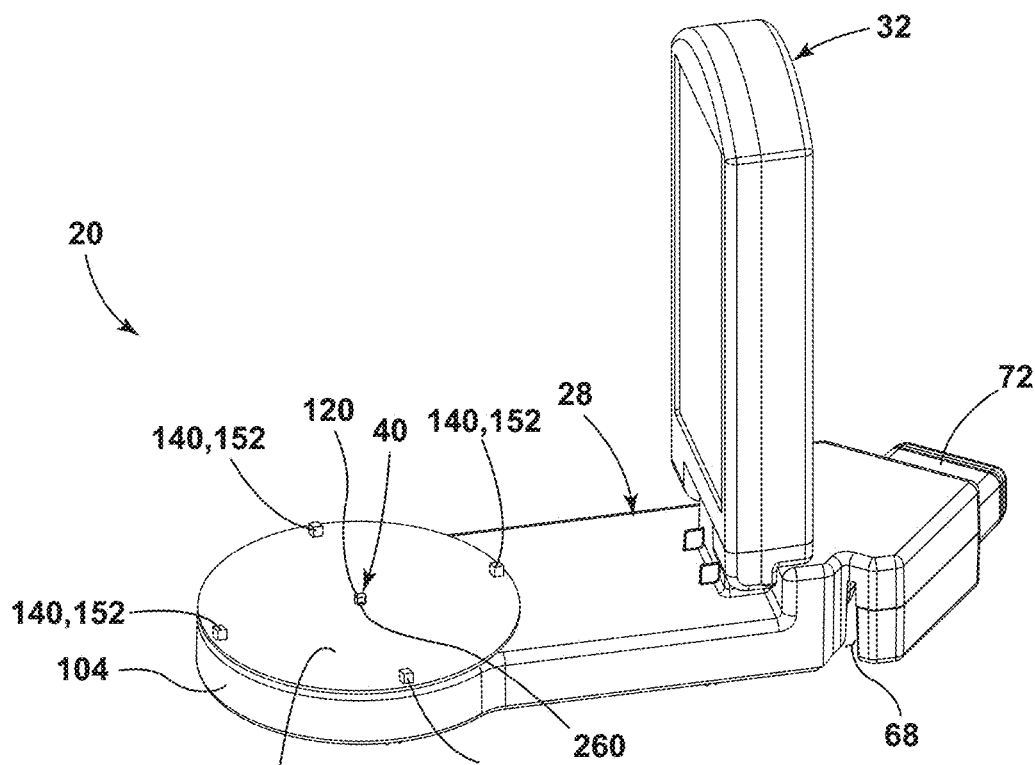
FIG. 9 is a side perspective view of an accessory for an oven of the present disclosure.

Referring to FIGS. 8 and 9, the accessory 20 is shown with various embodiments of the roller assembly 140. The roller assembly 140 is positioned on the support base 28 at the circular portion 104. The embodiment depicted in FIG. 8 includes the opening 144, the roller arms 148, and the rollers 152. The roller assembly 140 of FIG. 8 is positioned between the support base 28 and the rotary pan 44 (FIG. 3) and does not directly couple with the drive hub 120. Rather, the embodiment shown in FIG. 8 allows the drive hub 120 to pass through the opening 144 and ultimately engage with the rotary pan 44. More specifically, the cap 128 of the drive hub 120 can pass through the opening 144 to engage with the raised region 162 of the rotary pan 44. The protrusion 156 on the cap 128 engages with a corresponding portion of the raised region 162 such that rotational motion of the cap 128 is transmitted to the rotary pan 44. In this embodiment, the roller assembly 140 can rotate freely between the support base 28 and the rotary pan 44 during operation. This free rotation of the roller assembly 140 reduces the frictional force that would otherwise be experienced by the rotary pan 44 during rotation on the support base 28. Referring now to the embodiment shown in FIG. 9, a support plate 256 is operably coupled to the rollers 152 at a perimeter of the support plate 256. In the embodiment shown in FIG. 9, the roller assembly 140 and the rollers 152 are one and the same. The rollers 152 in this embodiment are free to rotate about their rotational axis relative to their geometric centers. However, the roller assembly 140 and rollers 152 do not rotate about the center of the support plate 256. In other words, the roller assembly and rollers 152 in FIG. 9 have a single rotational axis, whereas the roller assembly 140 and the rollers 152 shown in FIG. 8 have a first rotational axis, defined by the roller arms 148, and a second rotational axis, defined by the drive assembly 40. Additionally, the support plate 256 is equipped with a support plate aperture 260 through which the drive hub 120 extends without actively engaging the support plate 256. That is, the support plate 256 can rest upon the support base 28 with the drive hub 120 passing through the support plate aperture 260 to engage with the rotary pan 44. In such an embodiment, the rollers 152 can similarly reduce the frictional force that would otherwise exist between the rotary pan 44 and the support base 28 during operation. In each of the embodiments shown, the support base 28 is hingedly coupled to the heating element 32. Additionally, the support base 28 further includes the slot 68 and the plug 72.

Figure 10:
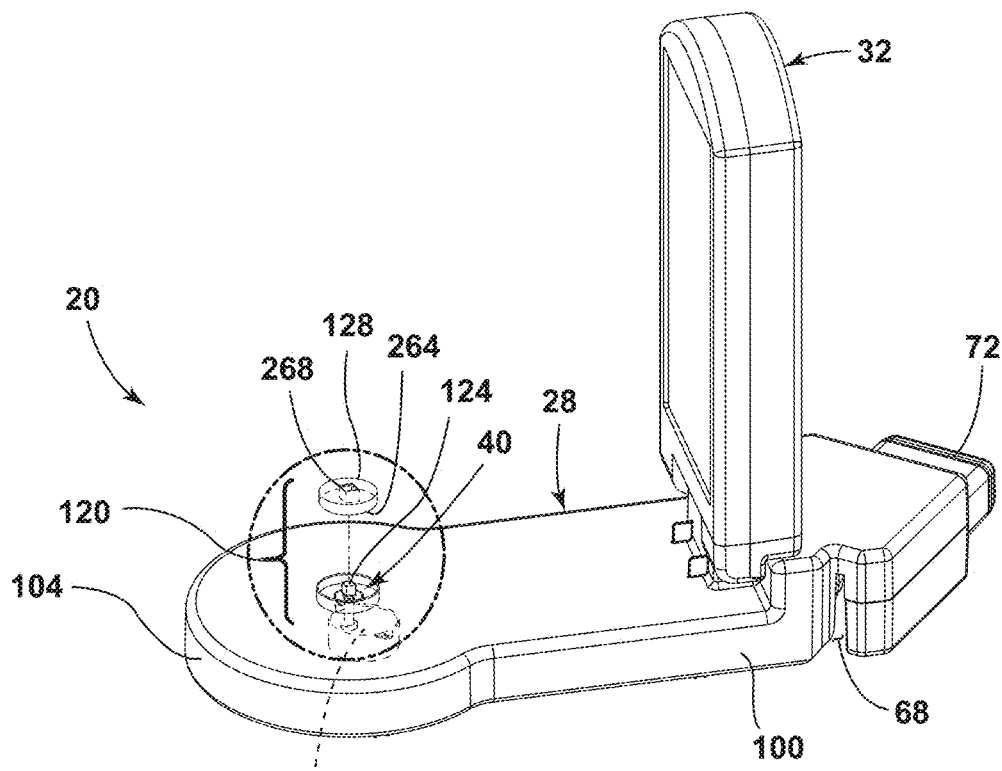
FIG. 10 is a side perspective view of an accessory for an oven.
Figure 11:
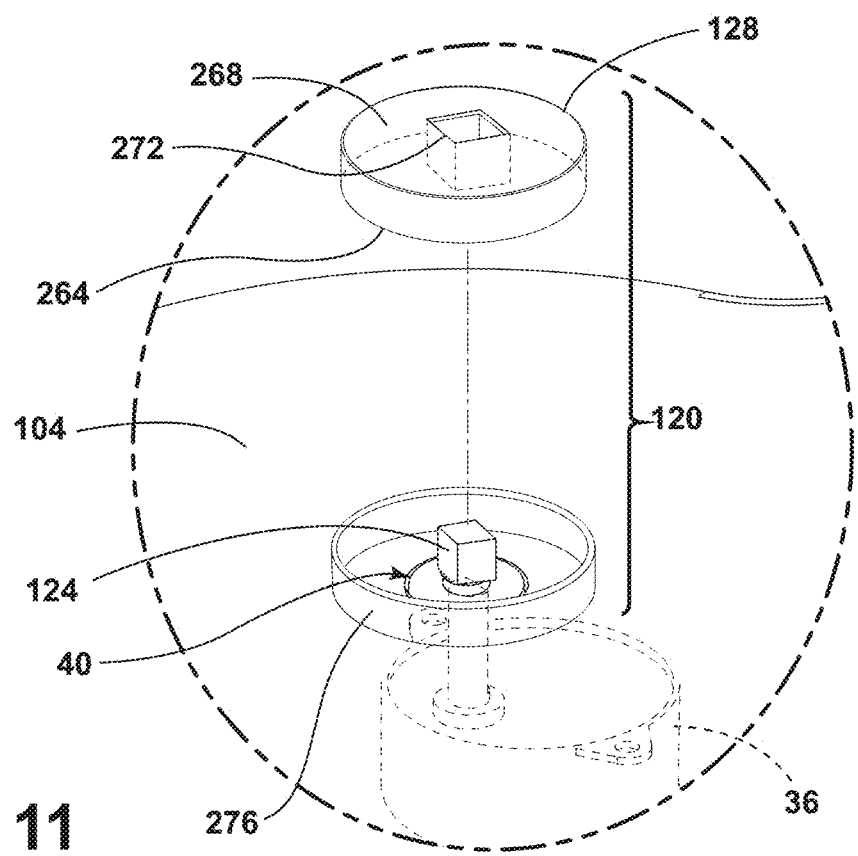
FIG. 11 is an enlarged view of the drive hub of the accessory for the oven taken at section XI of FIG. 10.

Referring now to FIGS. 10 and 11, the accessory 20 includes the support base 28 having the slot 68 and the plug 72. The heating element 32 is hingedly coupled to the support base 28 at the rectangular portion 100 of the support base 28. The motor 36 and the drive assembly 40 are positioned within the support base 28. More specifically, the motor 36 and the drive assembly 40 are positioned within the circular portion 104 of the support base 28. The drive hub 120 of the drive assembly 40 includes the motor flange 124 and the cap 128. The motor flange 124 is operably coupled to the motor 36. An alternative embodiment of the cap 128 to that shown in FIG. 3 is shown here in FIGS. 10 and 11. The alternative embodiment of the cap 128 includes a first side 264 that operably couples with the motor flange 124 and a second side 268 that operably couples with the rotary pan 44. The first side 264 of the cap 128 includes a motor flange engagement portion 272. The second side 268 of the cap 128 can be substantially planar and continuous such that drippings from the foodstuff being cooked by the accessory 20 do not drip down into the support base 28 or the motor 36. To aid in preventing drippings from entering the support base 28 or the motor 36, the support base 28 can include a raised structure 276 that has complimentary dimensions to those of the cap 128 such that the cap 128 can slidably engage with the raised structure 276 and the sides of the cap 128 are then positioned radially outward of the sides of the raised structure.

Figure 12:
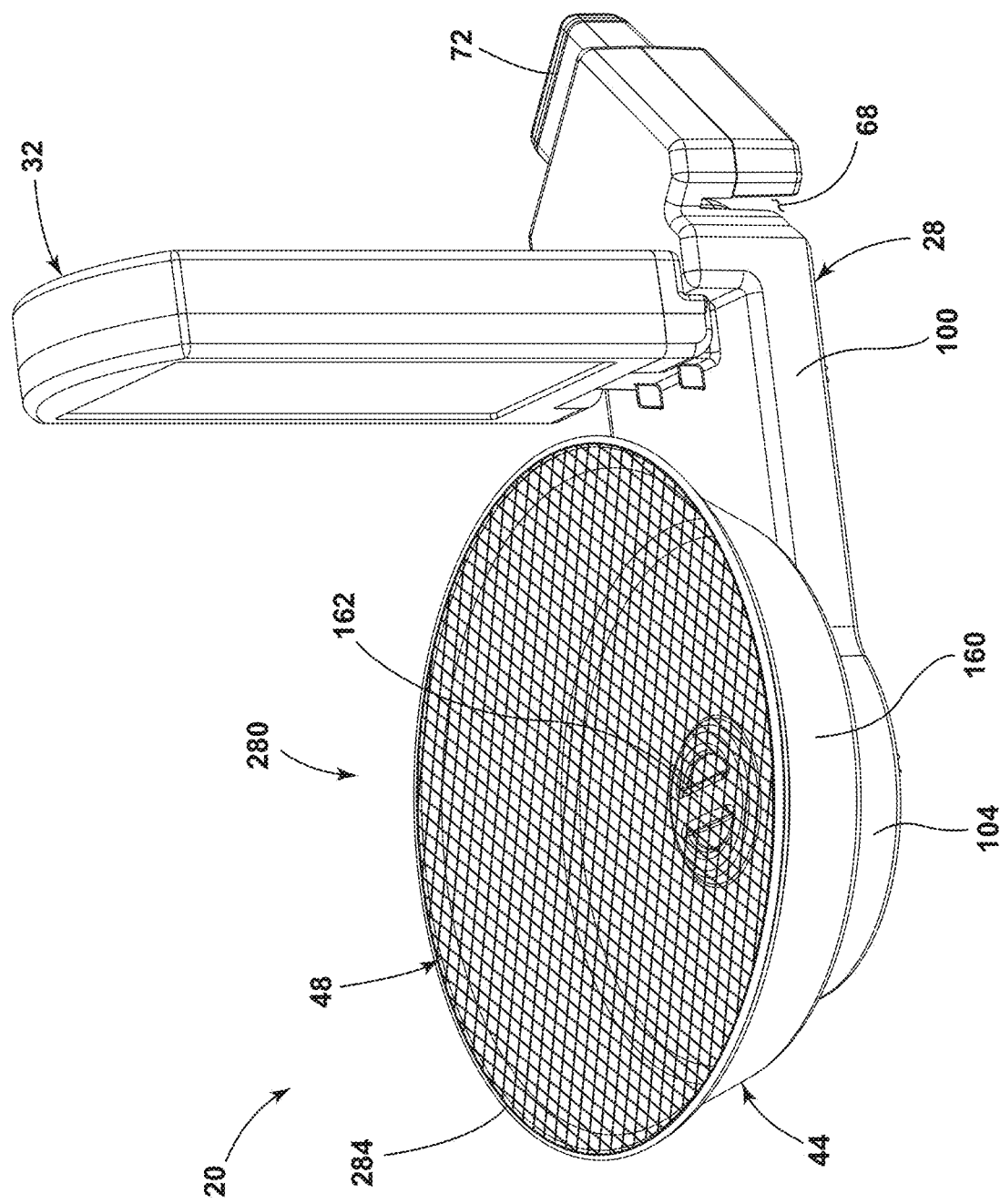
FIG. 12 is a side perspective view of an accessory for an oven illustrating a food holder assembly of the present disclosure.

Referring to FIG. 12, an alternative embodiment of the accessory 20 is shown as an air cooker 280. The air cooker 280 employs an alternative embodiment of the food holder assembly 48. The alternative embodiment of the food holder assembly 48 employs a mesh top 284 positioned over the rotary pan 44 and having a diameter that is generally or substantially similar to the second diameter of the rotary pan 44 such that the rotary pan 44 supports the mesh top 284 at an upper portion of the rotary pan 44. While shown with the food holder assembly 48 not employing the holder base 76, the spit rod 80, and the upper stabilizer fork 84, one of skill in the art will recognize that the vertical rotisserie embodiment depicted in FIG. 1 can be combined with the air cooker 280 shown here with minor alterations. The rotary pan 44 includes the side walls 160 that slope from the first diameter to the second diameter of the rotary pan 44. The rotary pan 44 can include the raised region 162 in the bottom of the rotary pan 44 while maintaining a continuous surface such that drippings from the foodstuff being cooked cannot enter the support base 28 or motor 36. The rotary pan 44 is supported on the circular portion 104 of the support base 28 and engages with the cap 128. The cap 128 and the raised region 162 are configured with complementary dimensions such that the cap 128 positively engages with the raised region 162 and can transmit rotational motion from the cap 128 to the rotary pan 44. Alternatively, the cap 128 can retain the rotary pan 44 to the support base 28 and/or prevents drippings from the foodstuff being cooked from entering the support base 28 and/or the motor 36. The heating element 32 is hingedly coupled to the support base 28 at the rectangular portion 100 of the support base 28. The support base 28 further includes the slot 68 and the plug 72.

Figure 13A:
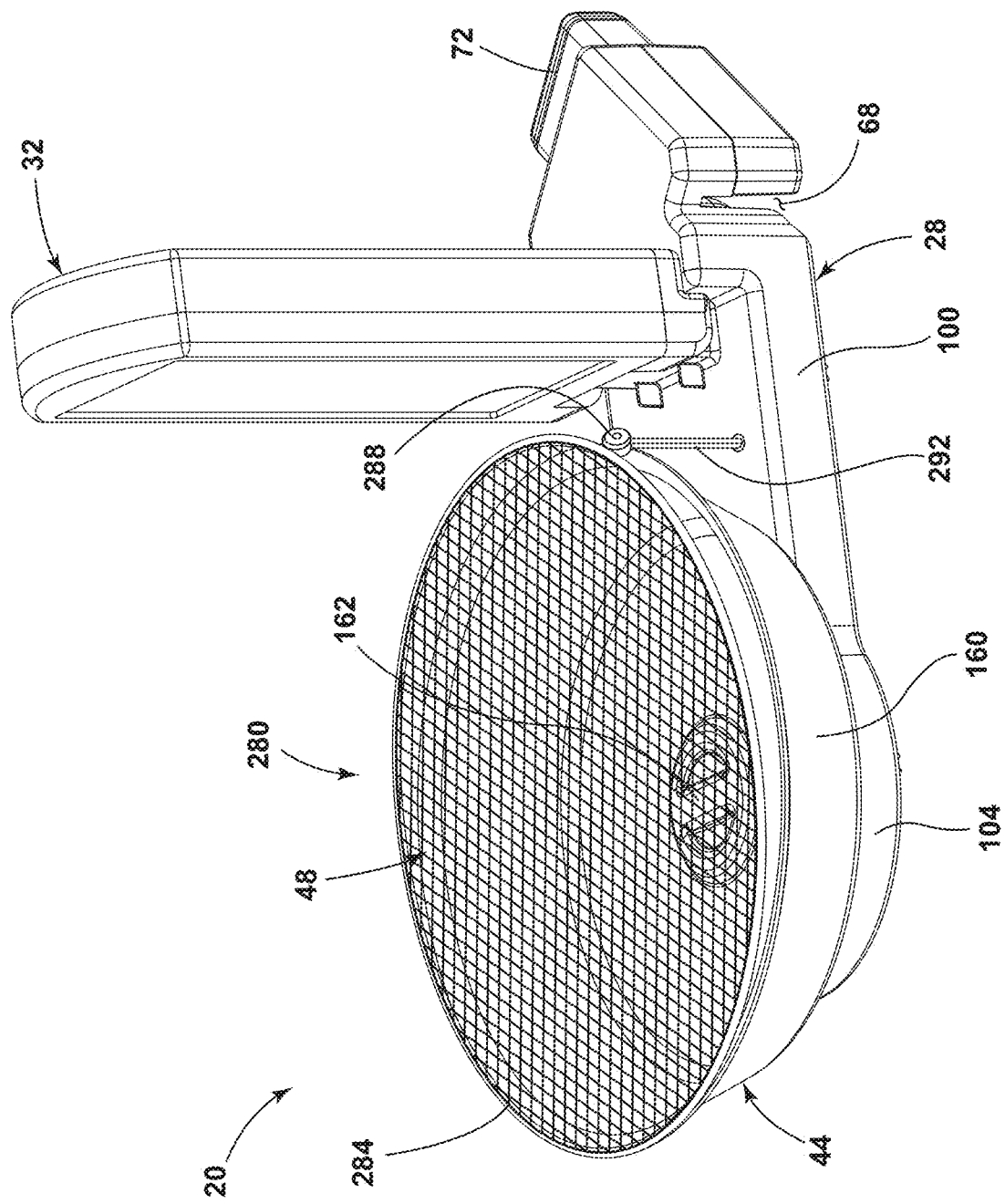
FIG. 13A is a side perspective view of an accessory for an oven having a wobble wheel.
Figure 13B:
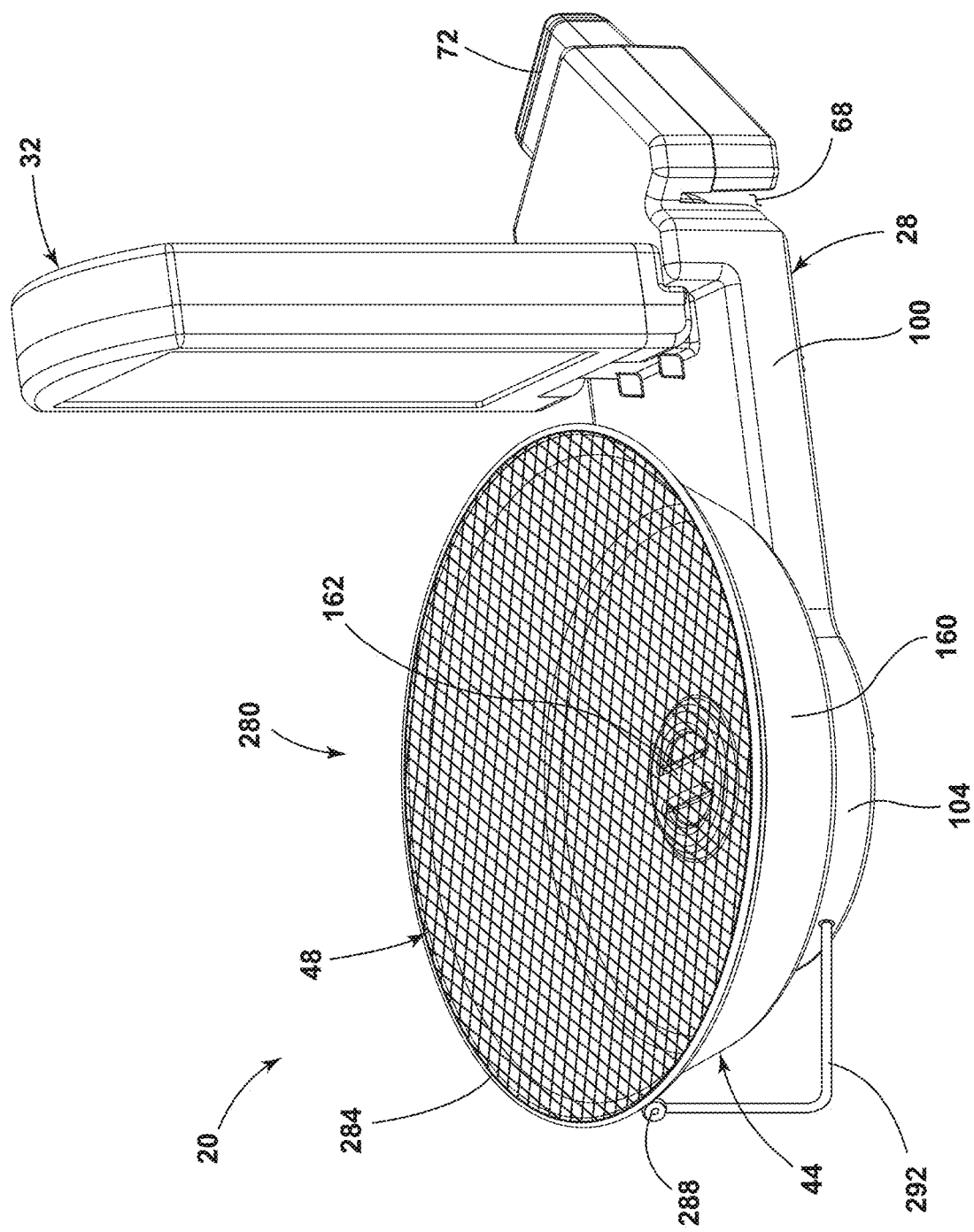
FIG. 13B is a side perspective view of an accessory for an oven illustrating a wobble wheel of the present disclosure.

Referring now to FIGS. 13A and 13B, the air cooker 280 is shown with the additional functionality of a wobble wheel 288. The wobble wheel 288 is operably coupled to the support base 28 by a shaft 292. The wobble wheel 288 engages with an underside of the mesh top 284 such that the mesh top 284 is partially raised off of the rotary pan 44 by the wobble wheel 288.

The raising of the mesh top 284 by the wobble wheel 288 angles the mesh top 284 such that the foodstuffs supported by the mesh top 284 are contacted by heat from the heating element 32 over an increased surface area of the foodstuffs. The wobble wheel 288 and shaft 292 can be positioned on the rectangular portion 100 of the support base 28 between the rotary pan 44 and the heating element 32 (FIG. 13A). Alternatively, the wobble wheel 288 and the shaft 292 can be positioned in the circular portion 104 of the support base 28 with the rotary pan 44 in between the wobble wheel 288 and the heating element 32 (FIG. 13B). In the embodiment shown in FIG. 13A, foodstuffs supported by the mesh top 284 are granted increased direct heat from the heating element 32 to an underside of the foodstuff by the raising of the mesh top 284 by the wobble wheel 288. In the embodiment depicted in FIG. 13B, foodstuffs supported on the mesh top 284 are granted better access to heat from the heating element 32 on a top side of the foodstuff as a result of the angling of the mesh top 284 by the wobble wheel 288. The wobble wheel 288 can be movable in the vertical direction by the shaft 292 such that the mesh top 284 can be used at various pitch angles. As described above, the heating element 32 is hingedly coupled to the support base 28. Additionally, the support base 28 includes the slot 68 and the plug 72.

Figure 14:
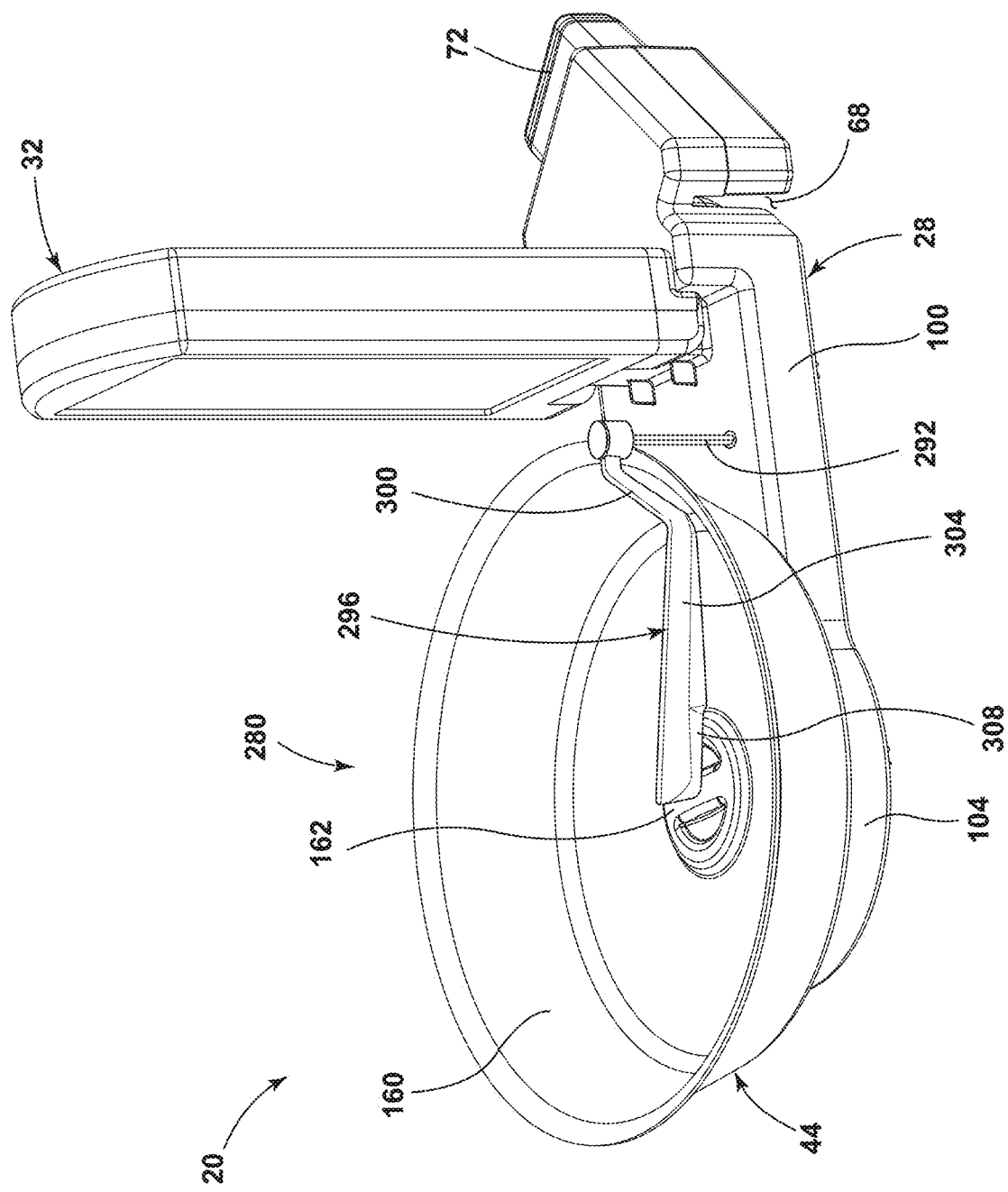
FIG. 14 is a side perspective view of the accessory for the oven according to another embodiment.

Referring to FIG. 14, an additional embodiment of the air cooker 280 is shown without the mesh top 284. In the embodiment shown, a stirrer 296 is operably coupled to the support base 28 and configured to extend into a cooking area of the rotary pan 44. The configuration of the stirrer 296 can be complimentary or generally correspond with the contours of the rotary pan 44. For example, the stirrer 296 can include an angled portion 300 that corresponds with the side walls 160 of the rotary pan 44, an arm portion 304 that extends from the first diameter of the rotary pan 44 toward a center of the rotary pan 44, and the arm portion 304 can include a raised portion 308 that is contoured to the raised region 162 of the rotary pan 44. The stirrer 296 can be operably coupled to the support base 28 by the shaft 292. The shaft 292 can be positioned between the rotary pan 44 and the heating element 32. Foodstuffs can be placed in the rotary pan 44. The foodstuffs are then stirred by the stirrer 296 as the rotary pan 44 is rotated on the support base 28. The stirrer 296 can be rotatable or pivotable upon the shaft 292. When the stirrer 296 is installed with the rotary pan 44 on the support base 28, the stirrer 296 remains generally or substantially rigid in its ability to rotate or pivot on the shaft 292. The general or substantial rigidity of the stirrer 296 when installed with the rotary pan 44 on the support base 28 can be provided by the support of the sides walls 160 preventing rotation of the stirrer 296. When installed with the rotary pan 44, the rotation of the stirrer can be limited to not greater than about 5 degrees, 10 degrees, or 15 degrees. In addition to being able to cook solid foods such as popcorn, breaded chicken, breaded fish, and coffee beans, the embodiment of the air cooker 280 that employs the stirrer 296 can also be used to cook liquid foodstuffs such as gravies and soups. Again, as described above, the heating element 32 is hingedly coupled to the support base 28 and the support base 28 further includes the slot 68 and the plug 72.

Figure 15:
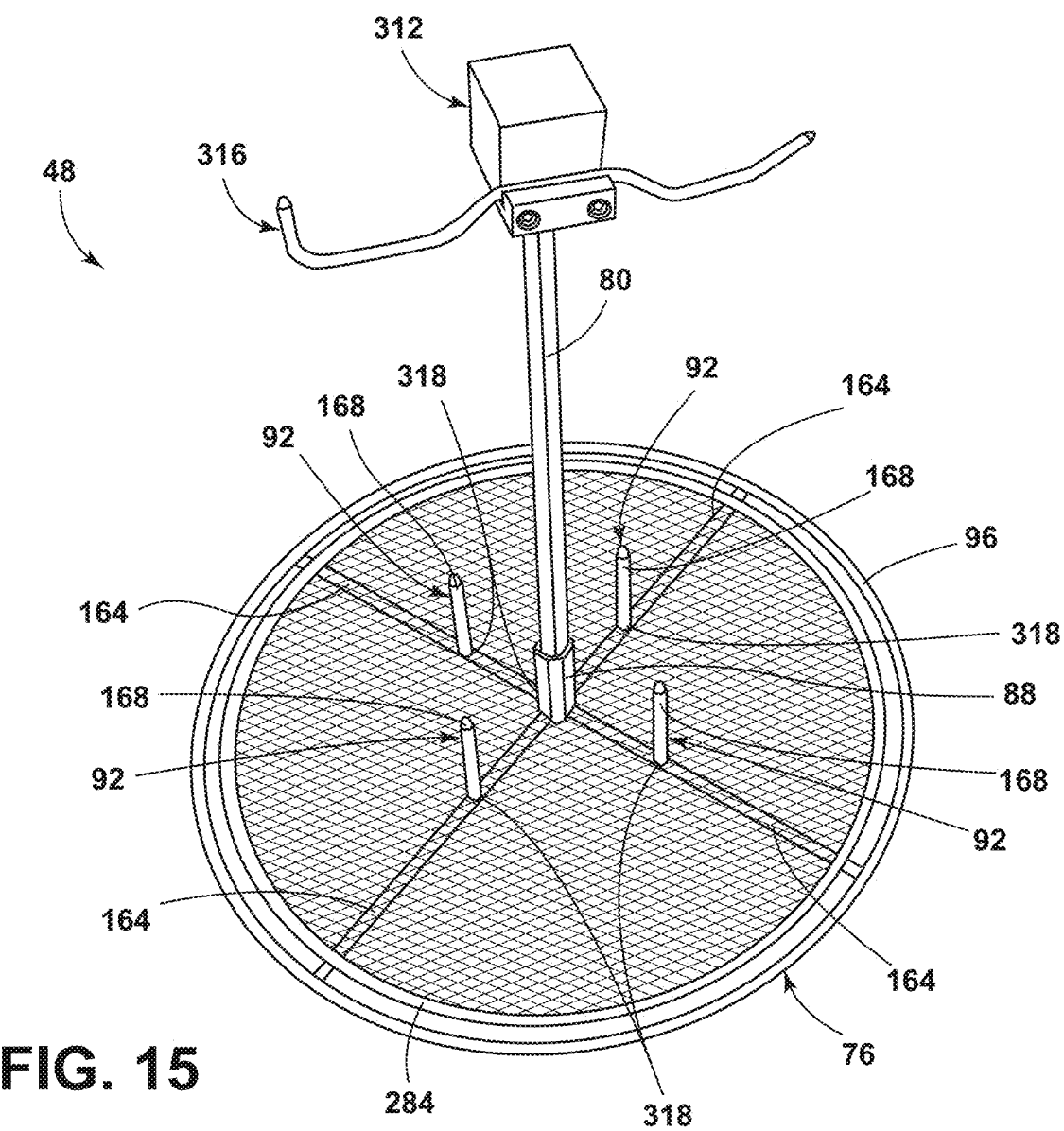
FIG. 15 is a top perspective view of a food holder assembly of the present disclosure.

Referring now to FIG. 15, an embodiment of the food holder assembly 48 is shown. The food holder assembly 48 includes the holder base 76, the spit rod 80, the spit-rod-receiving member 88, the lower stabilizer fork 92, the stabilizing member 96, the stabilizer arms 164, the upward extending posts 168, the mesh top 284, a spit rod adapter 312, and a food-hanging implement 316. The mesh top 284 can have a diameter that is greater than, less than, or equal to the diameter of the stabilizing member 96. The mesh top 284 is equipped with holder base apertures 318 that allow the mesh top 284 to slidably engage with the holder base 76. The spit rod adapter 312 is positioned at a top portion of the spit rod 80 and can be removably coupled to the spit rod 80. The food-hanging implement 316 is operably coupled to the spit rod adapter 312 such that foodstuffs coupled to the food-hanging implement 316 (e.g. bacon, pork tenderloin, etc.) hang from the top of the spit rod 80 and are cooked by the heating element 32 of the accessory 20 when the food holder assembly 48 is coupled to the rotary pan 44. The mesh top 284 can be positioned on top of the stabilizer arms 164 of the holder base 76 and provide additional support to foodstuffs that are hanging from the food-hanging implement 316. Additionally, the mesh top 284 can reduce, minimize, or eliminate splatter associated with fat and water dripping from the foodstuffs being cooked by inhibiting the flight of grease out of the rotary pan 44. More specifically, the mesh top 284 is elevated above the surface of the rotary pan 44, for example about one quarter of an inch, when the food holder assembly 48 is installed on the rotary pan 44, which allows the grease and drippings to boil underneath the mesh top 284 thereby decreasing the amount of splatter.

Figure 16:
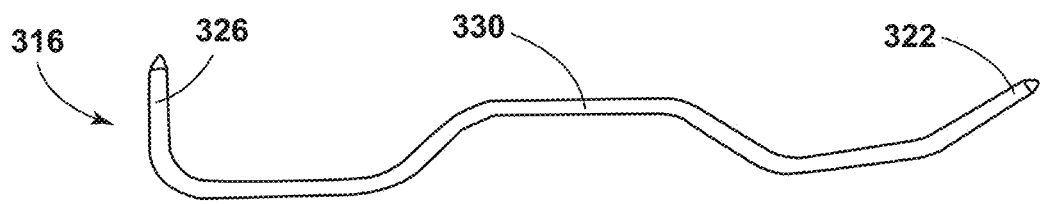
FIG. 16 is a side view of a food-hanging implement.
Figure 17:
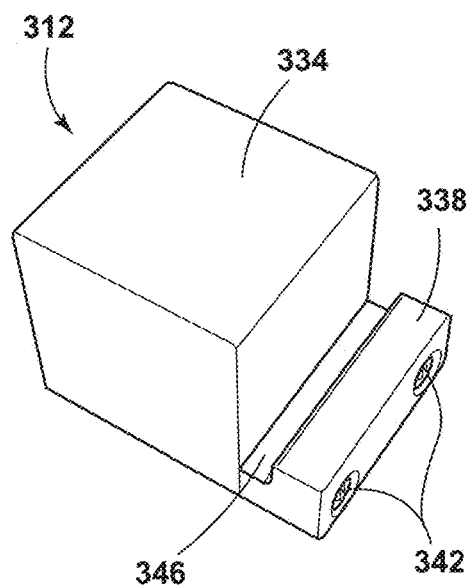
FIG. 17 is a top perspective view of a spit rod adapter.
Figure 18:
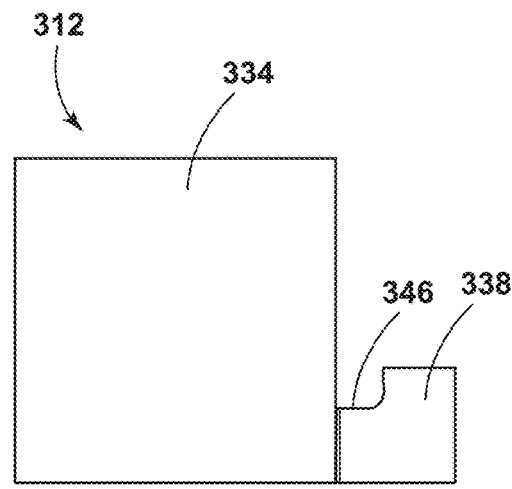
FIG. 18 is a side view of a spit rod adapter.
Figure 19:
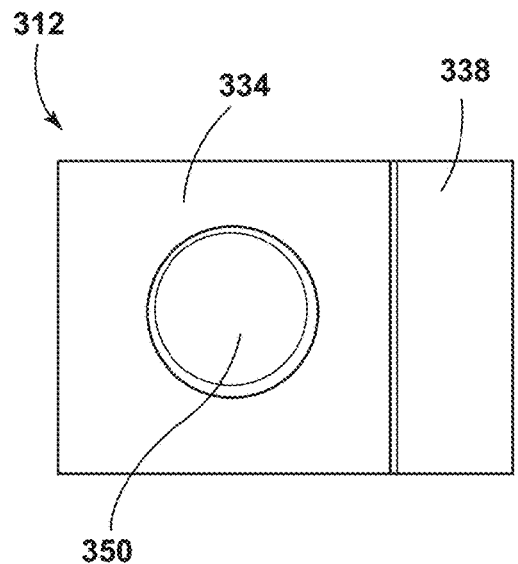
FIG. 19 is a bottom view of a spit rod adapter.
Figure 20:
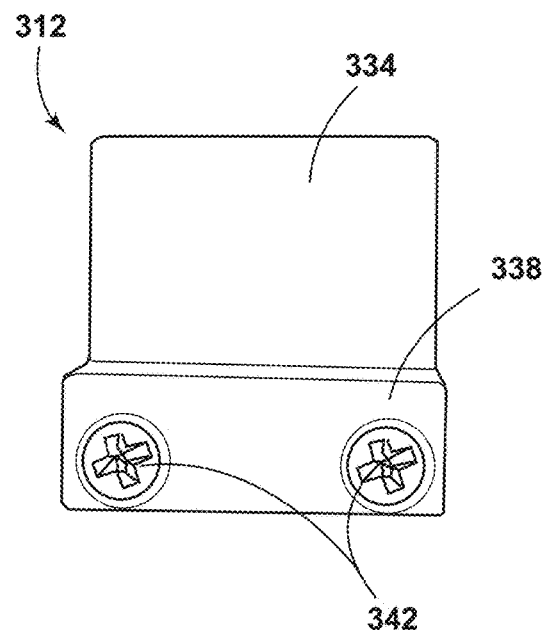
FIG. 20 is a front view of a spit rod adapter.

Referring to FIG. 16, the food-hanging implement 316 can include a food piercing end 322, a handle end 326, and a spit-rod-adapter-engagement portion 330. The spit-rod-adapter-engagement portion 330 is intermediately positioned between the food piercing end 322 and the handle end 326. The food-hanging implement 316 is removably coupled to the spit rod adapter 312 (FIG. 15). When utilizing the food-hanging implement 316, a user grasps the handle end 326 and pierces the foodstuff with the food piercing end 322. Once coupled to the food-hanging implement 316, the foodstuff can be positioned between the food piercing end 322 and the spit-rod-adapter-engagement portion 330 or between the handle end 326 and the spit-rod-adapter-engagement portion 330. It is beneficial if the spit-rod-adapter-engagement portion 330 is generally free of engagement with the foodstuff during the cooking process to avoid imbalance or misalignment between the spit rod adapter 312 and the food-hanging implement 316. The food piercing end 322 and the handle end 326 can include a generally horizontal portion that is flanked on either side by non-horizontal or generally vertical portions.

Referring now to FIGS. 17-20, the spit rod adapter 312 is shown from various perspectives. The spit rod adapter 312 can include a body portion 334 and a shelf portion 338. The body portion 334 and the shelf portion 338 can be coupled by at least one fastener 342, such as screws, bolts, rivets, welding, and the like. Alternatively, the body portion 334 and the shelf portion 338 can be integrally formed with one another. The coupling between the body portion 334 and the shelf portion 338 defines a channel 346 that is configured to engage with the spit-rod-adapter-engagement portion 330 of the food-hanging implement 316 (FIG. 15). An underside of the spit rod adapter 312 can include a depression 350 configured to engage with the top portion of the spit rod 80. While the depression 350 is shown as generally circular, one of skill in the art will recognize that other shapes, sizes, locations, and dimensions can be employed without departing from the concepts disclosed herein. For example, the depression 350 can be a linear alcove, cross-like, rectangular, pentagonal, hexagonal, or generally take the shape of a polygon. Alternatively, the depression 350 can provide a pass-through for the spit rod 80, similar to the central portion 200 of the upper stabilizer fork 84 (FIG. 5). The spit rod adapter 312 can also employ the resilient member 170 to positively retain the spit rod adapter 312 to the spit rod 80 (FIG. 5).

Rotisserie cooking in the oven 24 is traditionally done by manufacturing an oven cavity where there is a port in the wall of the oven 24 through which the spit rod 80 passes. The spit rod 80 is then coupled to an electric motor that is located outside the oven 24 and protected by the wall of the oven 24 and insulation present in the wall of the oven 24. These traditional rotisseries orient the spit rod 80 in a horizontal position. Horizontally orienting the spit rod 80 and the rotisserie presents at least two fundamental issues. First, the spit rod 80 coupling to the motor hub, or drive hub 120, must remain relatively loose so that the consumer can successfully couple the spit rod 80 to the drive hub 120. This first issue presents the added difficulty that the motor 36 is typically mounted in the rear wall of the oven 24, which is distant from the consumer. Second, loads imparted by the foodstuff being cooked, especially poultry, are rotationally imbalanced. This rotational imbalance of the foodstuff being cooked means that as the foodstuff is rotating and passes a zenith or apex of the rotation, the looseness of the coupling between the spit rod 80 and the drive hub 120 results in the foodstuff "flopping" as dictated by the tolerance in the components of the rotisserie. The flopping of the foodstuff can create an audible rattling that leads to a very low perception of quality by the consumer. Additionally, the rattling of the rotisserie components can cause the rotisserie fork hardware, such as screws, to back out or further loosen with subsequent impacts of the many rotations associated with rotisserie cooking.

The concepts disclosed herein overcome these and other issues associated with horizontal rotisserie cooking. The accessory 20 disclosed herein is provided as a self-contained apparatus capable of assembly outside of the cavity of the oven 24. This assembly of the accessory 20 outside of the cavity of the oven 24 eliminates the frustrating and difficult task of coupling the spit rod 80 to the drive hub 120 that includes reaching to the rear wall of the oven 24 while bent over or kneeling on the kitchen floor. The accessory 20 can be inserted into the cavity of the oven 24 entirely assembled, including the foodstuff to be cooked, and optionally coupled to the base pan 60 for added stability and dripping/debris retention. Once inserted into the cavity of the oven 24, the consumer can easily couple the plug 72 on the accessory 20 with the power source in the cavity of the oven 24. The coupling of the plug 72 with the power source can be further simplified by the dimensions of the base pan 60 facilitating ideal alignment between the plug 72 and the power source within the cavity of the oven 24.

The accessory 20 disclosed herein is vertical and the food holder assembly 48 is free of rotational fasteners, such as screws, that can be loosened over time. The lack of rotational fasteners reduces or entirely eliminates the rattle associated with traditional rotisserie cooking methods. Further, the motor 36, the drive assembly 40, and the drive hub 120 are all contained within the support base 28, which is integral with the accessory 20, and proximal the rotary pan 44 that aids in transmission of the rotational motion to the food holder assembly 48. The containment of the motor 36, the drive assembly 40, and the drive hub 120 within the support base 28, rather than externally located with relation to the cavity of the oven 24 reduces the manufacturing tolerances utilized such that the rattle is substantially reduced or entirely eliminated. The reduction in the rattle is further accomplished by the engagement between the food holder assembly 48 and the rotary pan 44.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. An accessory for an oven, the accessory comprising:
   a support base comprising a plug, wherein the plug is configured to engage with a power source within an oven cavity, and wherein the plug is configured for detachable coupling with the power source of the oven cavity;
   a heating element hingedly coupled to the support base;
   a motor positioned in the support base;
   a drive assembly positioned in the support base and operably coupled to the motor; and
   a rotary pan operably coupled to the drive assembly and positioned on a top side of the support base.

2. The accessory of claim 1, wherein the drive assembly further comprises:
   a drive hub having a cap and a motor flange, wherein the motor flange operably couples with the motor;
   a first side of the cap operably couples with the motor flange; and
   a second side of the cap operably couples with the rotary pan.

3. The accessory of claim 1, wherein the rotary pan further comprises:
   a raised region in a central portion of the rotary pan, wherein the raised region is configured to engage with the drive assembly.

4. The accessory of claim 1, wherein the heating element is pivotable with respect to the support base through an angle of at least ninety degrees.

5. The accessory of claim 4, wherein the heating element is movable between a generally horizontal position and a generally vertical position.

6. The accessory of claim 1, wherein the rotary pan includes a plurality of feet operably coupled to an underside of the rotary pan.

7. The accessory of claim 1, wherein the rotary pan is rotatable with respect to the support base upon activation of the motor.

8. The accessory of claim 1, further comprising:
   a mesh top operably coupled to a top of the rotary pan.

9. The accessory of claim 8, wherein the mesh top is removable from the rotary pan.

10. The accessory of claim 8, further comprising:
    a wobble wheel operably coupled to the support base, wherein the wobble wheel engages with the mesh top.

11. The accessory of claim 10, wherein the wobble wheel is positioned between the heating element and the rotary pan.

12. The accessory of claim 10, wherein the rotary pan is positioned between the wobble wheel and the heating element.

13. The accessory of claim 10, wherein the wobble wheel is movable in a vertical direction such that the mesh top can be used at various pitch angles.

14. The accessory of claim 13, wherein as the pitch angle of the mesh top increases, a foodstuff resting upon the mesh top is provided with an increase in an amount of direct heating from the heating element.

15. The accessory of claim 13, wherein the stirrer comprises:
    an angled portion that corresponds with a side wall of the rotary pan.

16. The accessory of claim 15, wherein the stirrer further comprises:
    an arm portion that extends from the angled portion toward a center of the rotary pan.

17. The accessory of claim 1, further comprising:
    a stirrer operably coupled to the support base and configured to extend into a cooking area of the rotary pan.

18. The accessory of claim 17, further comprising:
    a shaft that extends from the support base, the shaft having an end, wherein the shaft supports the stirrer thereon.

19. The accessory of claim 18, wherein the stirrer is rotatable relative to the shaft.

20. The accessory of claim 19, wherein upon engagement with the rotary pan, rotation of the stirrer relative to the shaft is limited to not greater than fifteen degrees.

* * * * *